United States Patent
Giura

(10) Patent No.: US 10,129,212 B2
(45) Date of Patent: Nov. 13, 2018

(54) COMPUTATION OF HISTORICAL DATA

(71) Applicant: AT&T Intellectual Property I, L.P., Atlanta, GA (US)

(72) Inventor: Paul Giura, Cohoes, NY (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 15/203,479

(22) Filed: Jul. 6, 2016

(65) Prior Publication Data

US 2018/0013547 A1    Jan. 11, 2018

(51) Int. Cl.
*H04L 29/06* (2006.01)
*H04L 9/32* (2006.01)

(52) U.S. Cl.
CPC ............ *H04L 63/00* (2013.01); *H04L 9/3239* (2013.01); *H04L 63/12* (2013.01); *H04L 63/14* (2013.01)

(58) Field of Classification Search
None
See application file for complete search history.

(56) References Cited

U.S. PATENT DOCUMENTS

| | | |
|---|---|---|
| 7,243,226 B2 | 7/2007 | Newcombe et al. |
| 8,370,312 B1 | 2/2013 | Sawhney et al. |
| 8,769,304 B2 | 7/2014 | Kirsch |
| 8,886,992 B2 | 11/2014 | Leggette et al. |
| 9,059,894 B2 | 6/2015 | Saraswat et al. |
| 9,141,679 B2 | 9/2015 | Gopalan et al. |
| 9,830,478 B1 * | 11/2017 | Hale ................ G06F 21/71 |
| 2001/0012365 A1 * | 8/2001 | Gaedke ............ H03M 7/42 380/239 |
| 2006/0026430 A1 * | 2/2006 | Luo ................ G06F 21/14 713/176 |
| 2007/0011300 A1 * | 1/2007 | Hollebeek ........ G06F 11/0715 709/224 |
| 2009/0150991 A1 * | 6/2009 | Hoey ................ G06F 21/33 726/18 |
| 2010/0269024 A1 * | 10/2010 | Hao ................ H03M 13/13 714/777 |
| 2011/0191394 A1 * | 8/2011 | Winteregg ........ G06F 17/30 707/822 |
| 2012/0033807 A1 * | 2/2012 | Asim ................ G06F 19/323 380/44 |
| 2012/0173497 A1 * | 7/2012 | Devalla ............ G06F 21/51 707/698 |

(Continued)

OTHER PUBLICATIONS

Wang et al., "Toward secure and dependable storage services in cloud computing." Services Computing, IEEE Transactions on 5.2 (2012): 220-232. Retrieved on Apr. 21, 2016, 14 pages.

(Continued)

*Primary Examiner* — Malcolm Cribbs
(74) *Attorney, Agent, or Firm* — Amin, Turocy & Watson, LLP

(57) ABSTRACT

Secure computation of enterprise data in a cloud is provided, by a third party, such that values and data manipulation processes are encrypted through use cryptographic processes that are secure. A method can comprise performing operations including receiving security data representing an attribute included in a log file, generating encoded attribute data as a function of the attribute, a hash function, or salt data representing an alphanumeric string, and sending the encoded attribute data to a second device.

20 Claims, 10 Drawing Sheets

(56) References Cited

U.S. PATENT DOCUMENTS

| | | |
|---|---|---|
| 2013/0275546 A1 | 10/2013 | Saib |
| 2014/0064479 A1 | 3/2014 | Manikandan et al. |
| 2015/0033016 A1* | 1/2015 | Thornton .............. H04L 9/0825 713/171 |
| 2015/0163199 A1* | 6/2015 | Kailash ............... H04L 63/0209 726/11 |
| 2016/0044034 A1* | 2/2016 | Spilman ................ G06F 21/602 713/181 |
| 2016/0099971 A1 | 4/2016 | De Los et al. |
| 2016/0149863 A1* | 5/2016 | Walker .................... G06F 21/00 726/1 |
| 2016/0173364 A1* | 6/2016 | Pitio .................... G06Q 20/027 709/226 |
| 2017/0017957 A1* | 1/2017 | Radu .................. G06Q 20/3829 |

OTHER PUBLICATIONS

Wang et al., "A comprehensive framework for secure query processing on relational data in the cloud." Secure Data Management. Springer Berlin Heidelberg, 2011. 52-69. Retrieved on Apr. 21, 2016, 18 pages.

Sarkar et al., "A Symmetric Key Based Framework for Data Security in Cloud Computing." Special Conference Issue: National Conference on Cloud Computing & Bio Data. Retrieved on Apr. 21, 2016, 6 pages.

\* cited by examiner

COMPUTATION OF HISTORICAL DATA

TECHNICAL FIELD

The disclosed subject matter relates to secure computation of enterprise data in a cloud, by a third party, for certain types of values and data manipulation processes, wherein the values and data manipulation processes are encrypted through use cryptographic processes that are secure.

BACKGROUND

With the increased number of devices that connect to other devices hosted by commercial or corporate enterprises, it has been noted that there has been a steep increase in the network traffic and data that these connecting devices generate, or that can be generated in regard to these connecting devices. Many corporate or commercial enterprises or business entities capture and/or store such business, corporate, or commercial enterprise specific data for extended periods of time with the ultimate intent of beneficially extracting intelligence in regard to the various connecting devices, servers, services, workstations, and business entities, and their respective activities with respect to devices maintained or operated by the corporate enterprise for future commercial gain.

Further, most, if not all, business and/or commercial enterprises can want to perform data analysis, especially in cases where security incidents occur, or to undertake forensic investigations in situations where devices operated by the corporate entity/enterprise come under attack to temporarily or indefinitely interrupt or suspend services hosted by the server devices controlled/maintained by the enterprise and connected to the Internet (e.g., distributed denial-of-service (DDoS) attack). Many of the enterprises/business capturing and collecting such proprietary data typically do not possess the personnel, infrastructure, facilities, functionalities and/or capabilities, and/or knowledge to efficiently and effectively analyze such data. These enterprises/corporations, being at a relative commercial and competitive disadvantage, must rely on third-party vendors that specialize in performing such data analysis, to provide long term storage and/or supply the computational power necessary for processing the collected enterprise specific data.

In most cases and to date, business enterprises have generally either upload enterprise specific data to a cloud infrastructure for further processing by reliable third-party vendors, or third-party vendors have requested and gained access to propriety enterprise data from storage devices situated within an internal network maintained by the commercial venture. Such unfettered, and/or possibly uncontrolled, access to internal networks and enterprise propriety raw data can raise and create concerns regarding privacy risks to the enterprise and its commercially sensitive, valuable, and proprietary data. As such, in order to mitigate the privacy and security risks associated with "outsourcing" the processing of commercially sensitive data, many commercial enterprises prefer to obviate the risks by processing enterprise sensitive data in-house, despite the fact that they generally have constrained resources and limited technical knowledge in regard to processing and manipulating enterprise specific raw data in order to extract the maximum benefit of such processing and manipulation, which severely undermines the true value of the collected data and the aim of collecting the data.

DETAILED DESCRIPTION

Figure 1:
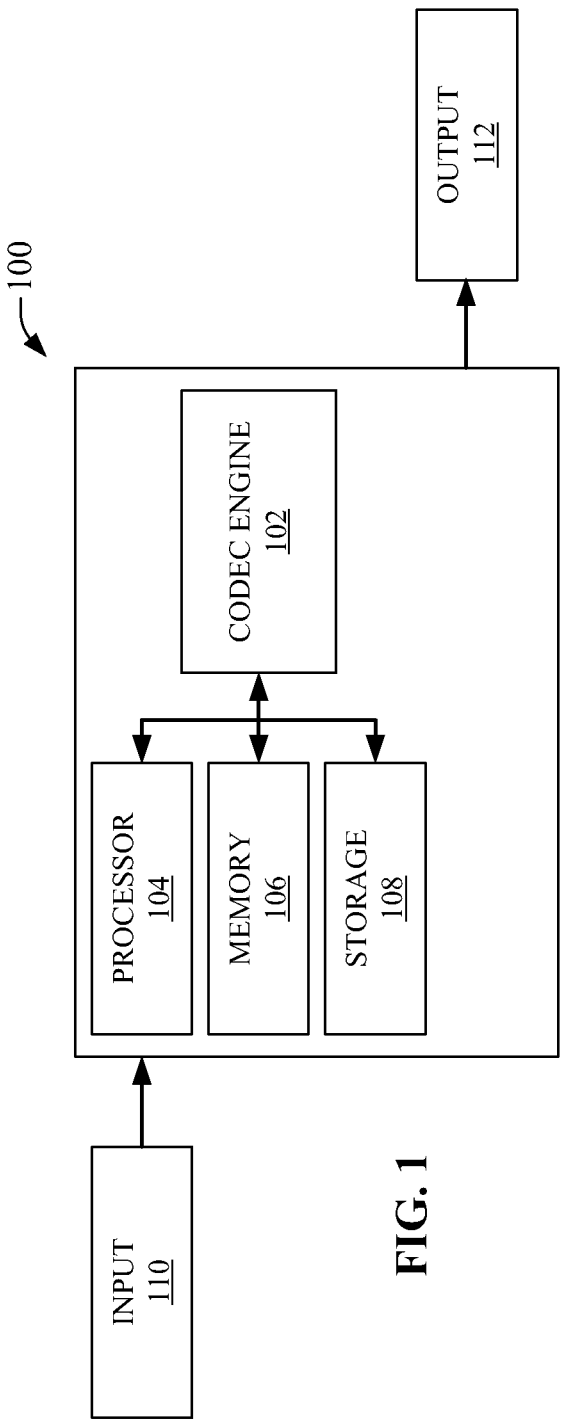
FIG. 1 is an illustration of a system for providing secure computation of enterprise data in a cloud, by third party secure cloud computation vendors, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

The subject disclosure describes and provides systems and methods for the secure computation of enterprise data in a cloud, by third party secure cloud computation vendors, for certain types of values and data manipulation processes, wherein the values and the data manipulation processes can be encrypted through use cryptographic functionalities and facilities. In order to accomplish the foregoing, the disclosure provides an efficient encoding scheme for raw data that uses one-way cryptographic hash functions and unique salt values that are only known to a specific enterprise or business organization. When data is outsourced for third party computation, manipulation, and/or processing (or for long term storage) no information regarding the semantics of the underlying raw data is disclosed other than the result or product generated as output of the application of the one-way cryptographic hash functions used to transform raw data into encrypted data. Moreover, to misdirect potential adversaries regarding the semantics of the underlying/real raw data, dummy fields/values can be created and inserted, wherein the dummy fields/values mimic and/or have similar characteristics as the output of the one-way cryptographic hash functions as applied to the real raw data.

The processes/algorithms used, at the third party secure cloud computation vendor site, to compute, manipulate, and/or process the real raw data (now encrypted through application of one-way cryptographic hash functions to the raw data) can have been developed in-house and can be proprietary to the business organization or enterprise, as such the proprietary data computation/manipulation processes/algorithms to be applied to the encrypted raw data can also be encrypted using similar one-way cryptographic hash functions, unique salt values, and insertion of dummy fields/values, and thereafter can packaged or bundled with the encrypted raw data, or these, now encrypted proprietary data computation/manipulation processes/algorithms can be sent separately for subsequent use in conjunction with the transmitted and encrypted raw data. Additionally and/or alternatively, the processes/algorithms employed to manipulate and/or process the encrypted real raw data can also be nonproprietary, generic data computation and/or manipulation processes/algorithms, nevertheless these too can also be encrypted through application of one or more one-way cryptographic hash functions, unique salt values, and inclusion of dummy fields/values to obscure the underlying generic data computation and/or manipulation processes/algorithms being utilized, and thereafter sent to the third party secure cloud computation vendor site for use with the encrypted raw data.

Use of the disclosed systems and methods for the secure computation, by third party secure cloud computation vendors, of enterprise data in a cloud, would allow enterprises/organizations using the foregoing processes/systems to utilize third-party cloud solutions as a secure, less expensive, and efficient choice for their data processing needs. Moreover, secure cloud computation vendors would be encouraged to develop more generic computational algorithms/processes, independent of data types and semantics, having larger applicability and being less customized, thereby saving time and effort.

In accordance with a non-limiting application example, as used solely herein for purposes of exposition of the described and disclosed systems, devices, and/or methods, the disclosure assumes that historical data representative of enterprise network logs, such as security logs generated by network devices (e.g., firewall devices, proxy server devices, intrusion detection system devices, intrusion protection system devices, authentication devices, and the like) are stored with attributes, such that an event e is associated with one or more attributes a (e.g., $e=(a1, \ldots, aN)$, wherein N is an integer value that is greater than zero (0). The security logs are encoded using salted hashing for each attribute $(a1, \ldots, aN)$; that is an encoded event e when hashed using hash functions $H=(h1, \ldots, hN)$ results in $(h1(a1+s), \ldots, hN(aN+s))$, where s represents one or more enterprise secret salt values. The secret salt values are typically unique and secret alphanumeric strings known only to the enterprise or business owning the raw data being encrypted. Thus, no two enterprises or businesses will utilize the same secret salt values; every enterprise or business generally will have their own unique allocation, set, or grouping of secret salt values they can employ in conjunction with hash functions to encrypt their proprietary data.

For certain attributes the function applied to the attributes can be an identity function (e.g., $h1(a)=a$); for certain other attributes no secret salt values may be included while applying the hash function to the attribute (e.g., $h1(a)=h1(a)$, rather than $h1(a)=h1(a+s)$); and for certain additional attributes the attributes may be dummy fields having no relevance and/or no actual analog or correspondence in the actual collection of events e.

While encrypting or encoding raw data, a dictionary can be generated or constructed. The dictionary can comprise cryptographic key pairings (e.g., private/public cryptographic key pairs), one-way cryptographic hash functions used, salt values employed, the encoded values of the attributes (e.g., after performing a salted hash function on the attributes), the original values of the attributes (e.g., before application of the salted function to the attributes), attributes that actually are dummy attributes, attributes to which an identity hash function was applied, and attributes to which a hash function was applied but no salt values were included, etc. The dictionary can be maintained by the business enterprise and typically is not shared outside the organization; the generated dictionary is not typically sent to third party secure cloud computation vendors.

Once data has been encoded using salted hashing for each attribute, the encoded data (e.g., $h1(a1+s), \ldots, hN(aN+s)$) can be sent to one or more third party secure cloud computation vendors for processing, and thereafter the one or more third party secure cloud computation vendors can process and return of the results of such processing. The one or more third party secure cloud computation vendors can be selected to process the encoded data based on, or as a function of, server list data that can represent groups of third party secure cloud computation vendors that have the processing facilities and functionalities to undertake successful processing of the encoded attribute data, and use of one or more threshold values which can provide indication of factors such processing capacities associated with each of the one or more third party secure cloud computation vendors, for example. Further, use of a register of devices (e.g., a whitelist) that are approved as providing, or have been accorded, a defined privilege, defined service, or a defined access can also be used to select groups of third party secure cloud computation vendors. Typically, the results of the processing by the one or more third party secure cloud computation vendors will be in the form of processed encoded data.

Since the one or more third party secure cloud computation vendors will typically not have access to either secret salt or the dictionary, but possibly only access to an accompanying public encryption key that can be used by the third party secure cloud computation vendors to decode the received encoded data for further processing, the encoded attribute data sent by the enterprise or organization to the third party secure cloud computation vendors will be maintained inviolable. Third party secure cloud computation vendors will therefore be processing the hashed values of the attributes without actual knowledge of which of the attributes have been hashed using one-way cryptographic hash functions, the salt values employed, the original values of the attributes (e.g., before application of the salted function to the attributes), attributes that actually are dummy attributes, attributes to which an identity hash function was applied, and/or attributes to which a hash function was applied but no salt values were included.

In addition, to data that can be encoded using foregoing methodology, proprietary algorithms/processes (e.g., executable instructions that facilitate performance of operations) can also be developed "in-house" and bundled and sent with the encoded data to be used at third party secure cloud computation vendors to manipulate and process the encoded data. Thus, these proprietary processes (executable instructions that facilitate performance of operations), despite having been encrypted can still be executed by devices at third party secure cloud computation vendors, without the necessity for devices at the third party secure cloud computation vendors to decrypt the encoded/encrypted data and the proprietary processes, in order to effectuate execution of the instructions to perform the operations of the proprietary processes in application to the accompanying encoded/encrypted data.

The returned processed encoded data can then be decoded, in conjunction with the previously generated dictionary, to retrieve the processed attribute values which then can be employed, in the instance of the example application, for the purpose of network forensics, detection of distributed denial of service attacks, network anomaly detection, and the like, wherein connected graphs can be constructed.

It should be realized and appreciated by those of ordinary skill that the foregoing non-limiting example application is merely an illustration of a use of the disclosed and described solution and is provided only for the purposes of exposition. The described and disclosed subject matter is therefore not limited to the foregoing example application, but can find applicability in other more generalized circumstances and use applications.

The disclosed systems and methods, in accordance with an embodiment, provide a system, apparatus, or device comprising: a processor, and a memory that stores executable instructions that, when executed by the processor, facilitate performance of operations. The operations can comprise receiving security data representing an attribute included in a log file, generating encoded attribute data as a function of the attribute, a hash function, and/or salt data representing an alphanumeric string; and sending the encoded attribute data to a second device. Additional operations can include generating the encoded attribute data as a function of the attribute and an identity function; generating the encoded attribute data solely as a function of the attribute and hash function; maintaining a decoding dictionary comprising a key, an encoded value representing the encoded attribute data, and an original value representing the attribute; and decoding the encoded result data as a function of a decoding dictionary. Further operations can also include generating the encoded attribute data as a function of server list data representing a grouping of devices that satisfy a processing capacity threshold criterion/criteria value for processing the encoded attribute data; and generating the encoded attribute data in response to receiving a register of devices that are approved as providing a defined privilege, a defined service, or a defined access.

In regard to the foregoing in accordance with various embodiments the attribute can be a dummy attribute representing empty field data; the log file can be a firewall log file, a proxy log file, an intrusion detection system log file, or an intrusion protection system log file; and the second device can be a computation server device that processes the encoded attribute data to produce encoded result data.

In accordance with a further embodiment, the subject disclosure describes a method, comprising a series of acts that can include: generating, by a system comprising a processor, encoded attribute data as a function of an attribute included in a log file, a hash function, or salt data representing a string; and sending, by the system, the encoded attribute data to a device. Additional acts include maintaining, by the system, a decoding dictionary comprising a key, an encoded value representing the encoded attribute data, and an original value representing the attribute; generating, by the system, the encoded attribute data as a function of server list data representing a grouping of devices that satisfy a processing capacity threshold criterion/criteria value for processing the encoded attribute data by the device; and generating, by the system, encoded attribute data in response to receiving, by the system, a list of devices that are approved as providing a defined privilege, defined service, or a defined access. Other acts that can be performed include generating, by the system, the encoded attribute data as a function of the attribute and an identity function; and generating the encoded attribute data as a function of the attribute and a hash function.

In relation to the foregoing method, the log file can have been received from one of a firewall device, a proxy device, and intrusion detection system device, or an intrusion protection system device; and the device can be a computation server device that processes the encoded attribute data to produce encoded result data.

In accordance with a still further embodiment, the subject disclosure describes a machine readable storage medium, a computer readable storage device, or non-tangible machine readable media comprising instructions that, in response to execution, cause a computing system comprising at least one processor to perform operations. The operations can include: receiving event data representing an attribute included in a log file; generating encoded attribute data as a function of the attribute, a one-way cryptographic hash function, or salt data representing an alphanumeric string; and sending the encoded attribute data to a device to process the encoded attribute data. In accordance with this embodiment the operations can further include generating the encoded attribute data as a function of server list data representing a grouping of devices that satisfy a processing capacity threshold criterion value for processing the encoded attribute data.

Now with reference to the Figures, FIG. 1 illustrates a system 100 that in accordance with various embodiments provides for secure computation of enterprise data in a cloud, by third party secure cloud computation vendors. System 100 can include a codec engine 102 that can be coupled to a processor 104, memory 106, and storage 108. Codec engine 102 can be in communication with processor 104 for facilitating operation of computer or machine executable instructions and/or components by codec engine 102, memory 106, for storing data and/or the computer or machine executable instructions and/or components, and storage 108 for providing longer term storage of data and/or machine and/or computer readable instructions. Additionally, system 100 can also receive input 110 for use, manipulation, and/or transformation by codec engine 102 to produce one or more useful, concrete, and tangible result, and/or transform one or more articles to different states or things. Further, system 100 can also generate and output the useful, concrete, and tangible results and/or the transformed one or more articles produced by codec engine 102 and output as output 112.

System 100, for purposes of elucidation, can be any type of mechanism, machine, device, facility, apparatus, and/or instrument that includes a processor and/or is capable of effective and/or operative communication with a wired and/or wireless network topology. Mechanisms, machines, apparatuses, devices, facilities, and/or instruments that can comprise system 100 can include tablet computing devices, handheld devices, server class computing machines and/or databases, laptop computers, notebook computers, desktop computers, cell phones, smart phones, consumer appliances and/or instrumentation, industrial devices and/or components, hand-held devices, personal digital assistants, multimedia Internet enabled phones, multimedia players, and the like.

In accordance with an embodiment codec engine 102 can receive (as input 110) data, such as historical data representative of network data, such as security logs, created or generated, for example, by network devices such as firewall devices, authentication devices, proxy server devices, intrusion detection system devices, intrusion protection system devices, and the like. The data can comprise one or more attributes, for example, in the context of historical network data, such that an event e is associated with one or more attributes a (e.g., e=a1, a2, . . . , aN), wherein N is an integer value that is greater than zero (0). To these attributes (a1, a2, . . . , aN) codec engine 102 can apply a cryptographic hash function. The cryptographic hash function utilized is typically a function that allows for verification that a certain input data content maps to a certain mapped value, such that when the input data content is unknown, the input data content cannot be reconstructed solely as function of the mapped data. This assures the integrity of the mapped/encoded data. Examples of cryptographic hash functions that can be used for the purposes of the subject disclosure can include, secure hash algorithm 0 (SHA-0), secure hash algorithm 1 (SHA-1), secure hash algorithm 2 (SHA-2), secure hash algorithm 3 (SHA-3), MD5, and the like.

Prior to applying, or during application of, the cryptographic hash function to the one or more attributes, secret salt value(s) can be added, by codec engine 102, to the one or more attributes. The secret salt value(s) can be alphanumeric strings that are known only to the business organization generating and transforming attribute data to encrypted or encoded attribute data.

As has been noted earlier, for selected attributes the function applied to these attributes, rather than being the cryptographic hash function, can be an identity function; for other selected attributes no secret salt values may be included while applying the cryptographic hash function (and/or the identity function) to the attribute; and for yet other attributes these attributes may be dummy fields inserted by codec engine 102, wherein the dummy fields have no relation/significance and/or no actual analog or correspondence in the actual collection of events. For instance, in accordance with an aspect, the dummy fields can be empty fields or generated pseudorandom values.

Codec engine 102 in conjunction with, and while encrypting or encoding raw data can generate and maintain a data dictionary. The data dictionary can comprise cryptographic public/private key pairings, one-way cryptographic hash functions employed to has the data, salt values used, the encoded values of the attributes, the original values of the attributes, identify attributes that actually are dummy attributes, identify attributes to which an identity hash function rather than a one-way cryptograph hash function was applied, and identify attributes to which a one-way cryptographic hash function (and/or an identity function) was applied but to which no salt values were included, etc. The data dictionary created by codec engine 102 can be maintained by the business enterprise; the generated data dictionary is not typically sent to the third party secure cloud computation vendors.

Once data has been transformed using salted hashing for each attribute, the encoded data can be sent, by codec engine 102 as output 112, to third party secure cloud computation vendors for processing, and thereafter the third party secure cloud computation vendors can process and return of the results of such processing as input 110 to codec engine 102. Typically, the results of the processing by the third party secure cloud computation vendors can take the form of processed encoded data.

In regard to the foregoing, it should be noted that since third party secure cloud computation vendors do not have access to either secret salt or the dictionary, the encoded attribute data sent for processing by the enterprise or organization to the third party secure cloud computation vendors will be processed in an encoded form thus maintaining the secrecy of the underlying data. Third party secure cloud computation vendors will therefore be processing the hashed values of the attributes without actual knowledge of which of the attributes have been hashed using one-way cryptographic hash functions, the salt values employed, the original values of the attributes, which of the attributes are actually dummy attributes, to which of the attributes an identity hash function was applied, and/or to which of the attributes a hash function was applied but to which no salt values were included.

The returned now processed encoded data can then be decoded by codec engine 102, wherein codec engine 102, in conjunction with the previously generated dictionary, retrieves and unscrambles the processed attribute values by applying the appropriate cryptographic hash functions (or as the case may be, the identity function), and where necessary removing the salt values. The processed attribute values can then can be employed, for example, for the purpose of network forensics, detection of distributed denial of service attacks, network anomaly detection, and the like, wherein connected graphs can be constructed to facilitate such analysis.

Figure 2:
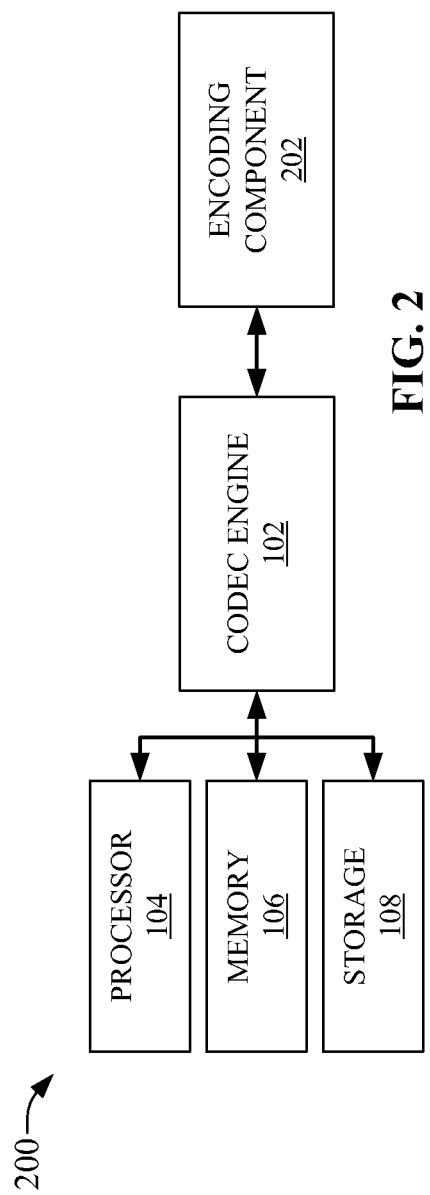
FIG. 2 is a further depiction of a further system for providing secure computation of enterprise data in a cloud, by third party secure cloud computation vendors, in accordance with aspects of the subject disclosure.

FIG. 2 provides further depiction of system 100, now depicted as system 200, in accordance with one or more various embodiments. System 200 can provide for secure computation of enterprise data in a cloud, by third party secure cloud computation vendors. System 200 can include encoding component 202, in conjunction with codec engine 100, processor 104, memory 106, and storage 108 can apply one or more cryptographic hash function to event data e that comprises one or more attributes (a1, a2, . . . aN). The cryptographic hash function utilized can typically be a function that allows for verification that a certain input data content maps to a certain mapped value, such that when the input data content is unknown, the input data content cannot be reconstructed or reconstituted solely as function of the mapped data. This feature assures the integrity of the mapped/encoded data. Examples of cryptographic hash functions that can be used by encoding component 202 can include, secure hash algorithm 0 (SHA-0), secure hash algorithm 1 (SHA-1), secure hash algorithm 2 (SHA-2), secure hash algorithm 3 (SHA-3), MD5, and the like.

Prior to applying, or contemporaneously with application of, the cryptographic hash function to the one or more attributes, secret salt value(s) can be added, by encoding component 202, to the one or more attributes. The secret salt value(s), as noted above, can be strings that are known only to the business organization generating and transforming attribute data to encrypted or encoded attribute data. In accordance with one example embodiment, the foregoing strings can be numeric strings. In a further example embodiment, the strings can be non-numeric character strings. In an additional example embodiment, the strings can be alphanumeric strings.

Encoding component 202 can for selected attributes, rather than applying a cryptographic hash function, can apply identity functions; for other selected attributes encoding component 202 can incorporate no secret salt values during application of the cryptographic hash function (and/or the identity function) to the attributes; and for attributes, encoding component 202 can use dummy fields, wherein such dummy fields have no relation/significance and/or no actual analog or correspondence in the actual collection of events represented by the attributes. For instance, an example aspect, encoding component 202 can incorporate empty fields or generated pseudorandom values as dummy fields.

Figure 3:
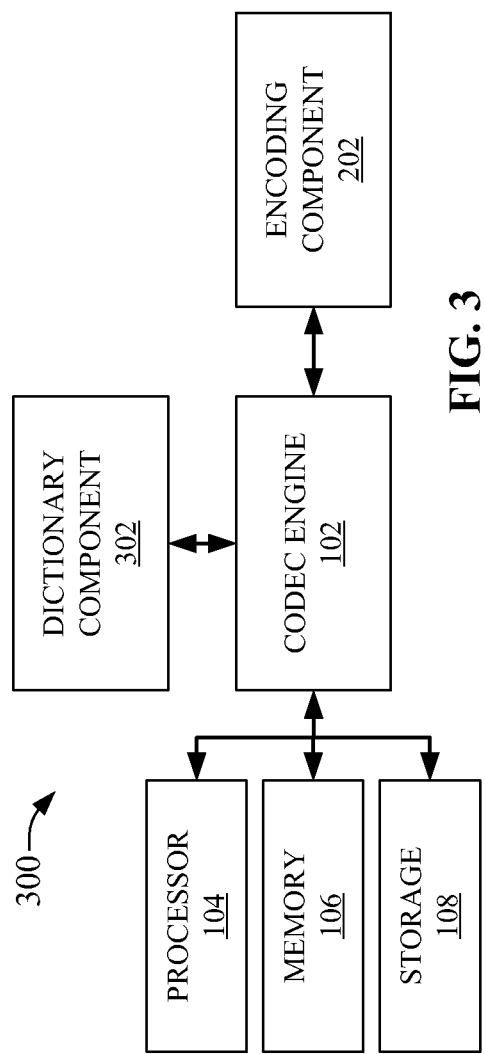
FIG. 3 provides illustration of an additional system for providing secure computation of enterprise data in a cloud, by third party secure cloud computation vendors, in accordance with aspects of the subject disclosure.

FIG. 3 provides additional illustration of system 100, now depicted as system 300, in accordance with additional example embodiments. System 300 include dictionary component 302 that in collaboration with encoding component 202, codec engine 102, processor 104, memory 106, and storage 108 constructs, generates, and maintains a data dictionary while encoding component 202 is encoding the event data e comprising attributes a. In accordance with an example aspect, the data dictionary can comprise cryptographic public/private key pairings, one-way cryptographic hash functions employed to hash data, whether or not salt values were used and the values of the salt values, the encoded values of the attributes (e.g., the values of the attributes subsequent to the addition of salt values and encryption), the original values of the attributes (e.g., the values of the attributes prior to the addition of salt values and encryption), identify attributes that are inserted dummy attributes/fields, identify attributes to which an identity hash function rather than a one-way cryptograph hash function was applied, and identify attributes to which a one-way cryptographic hash function (and/or an identity function) was applied but to which no salt values were included, etc. The data dictionary created by dictionary component 302 can be persisted or stored to storage 108 and controlled (e.g., kept secret) by the business entity. As will be appreciated by those of ordinary skill, the generated data dictionary is not typically divulged to the third party secure cloud computation vendors.

Once data has been transformed by encoding component 202 and data dictionary compiled by dictionary component 302, the encoded data can be sent to third party secure cloud computation vendors for processing. The third party secure cloud computation vendors can process the encoded data and then return the results of the processing as processed encoded data.

In regard to the foregoing, it should be noted that third party secure cloud computation vendors do not have access to either the secret salt(s) used in the encryption of the data or the data dictionary, only the encoded attribute data (inclusive of secret salt(s) used and dummy attributes incorporated) is sent for processing by the enterprise or organization to the third party secure cloud computation vendors. Third party secure cloud computation vendors will therefore be processing the cryptographically hashed values of the attributes without actual knowledge of which of the attributes have been hashed using one-way cryptographic hash functions, the salt values employed, the original values of the attributes, which of the attributes are actually dummy fields/attributes, to which of the attributes an identity hash function was applied, and/or to which of the attributes a hash function was applied but to which no salt values were included.

Figure 4:
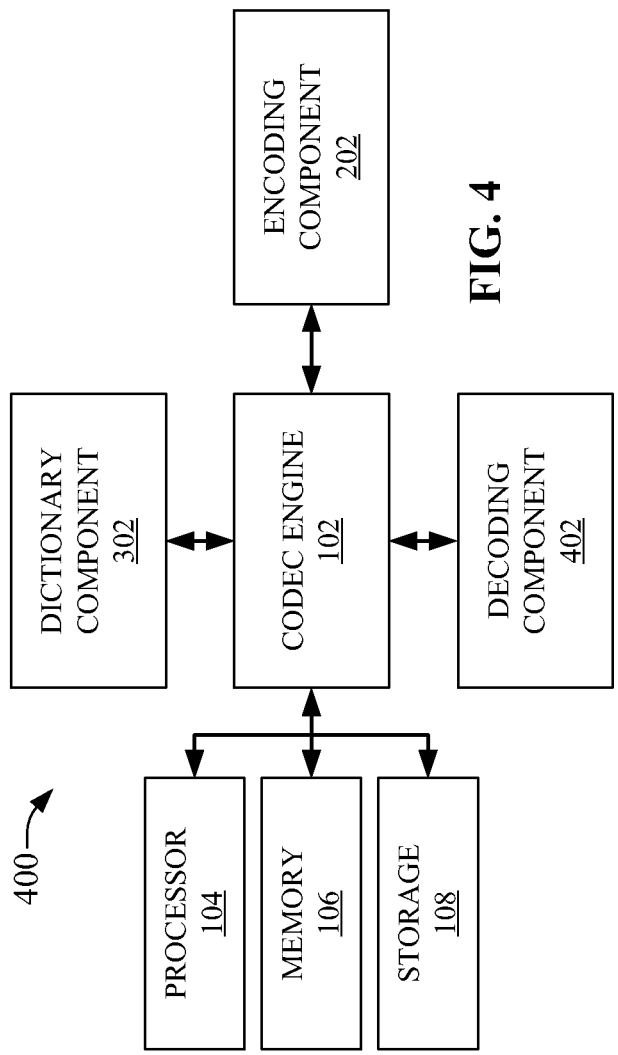
FIG. 4 provides another illustration of a system for providing secure computation of enterprise data in a cloud, by third party secure cloud computation vendors, in accordance with aspects of the subject disclosure.

Once processed encoded data is returned from the third party secure cloud computation vendors, the processed encoded data can be decoded by decoding component 402 as illustrated in FIG. 4. As depicted, decoding component 402 can be operatively and/or communicatively coupled to dictionary component 302, encoding component 202, codec engine 102 and processor 104, memory 106, and storage 108. Decoding component 402, in collaboration with dictionary component 302 and the earlier generated dictionary, can decrypt the processed encoded data to retrieve the processed attribute values. Decoding component 402 accomplishes this objective by applying the appropriate cryptographic hash function(s) (or as the case may be, the identity function(s)), ignoring inserted dummy attributes/fields, and where necessary removing salt values. The processed attribute values can then can be employed, for example, for the purpose of network forensics, detection of distributed denial of service attacks, and the like, wherein connected graphs can be constructed to facilitate such analysis.

Figure 5:
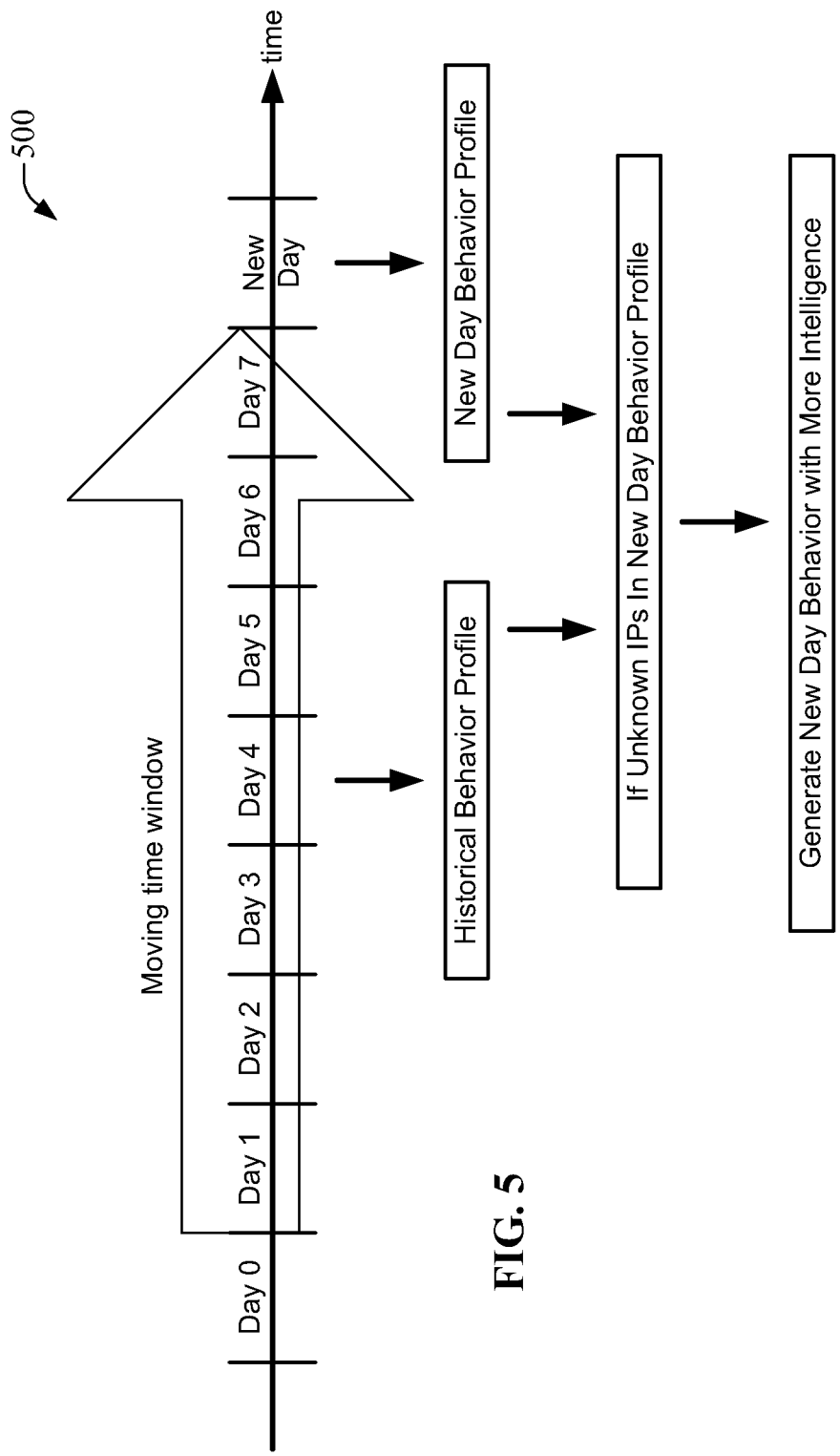
FIG. 5 illustrates another depiction of an example moving time window used to provide secure computation of enterprise data in a cloud, by third party secure cloud computation vendors, in accordance with aspects of the subject disclosure.

FIG. 5 illustrates an example moving time window that can be used to generate behavior profiles for purposes of network forensics, detection of distributed denial of service attacks, and the like, wherein connected graphs can be constructed to facilitate such analysis. The moving time window, for each identified device included in network traffic data, can be used to collect, identify, or determine behavior features such as new destination IP addresses, owners, ports used, actions performed, messages (and bytes) received and/or transmitted, etc. occurring within the defined or definable moving window. The moving window captures historical events that have occurred during a previous N days, where N is an integer greater than 0. The historical behavior features that occur within the moving window can be used to generate historical behavior profiles for each respective device included in the network traffic data. Thereafter, in response to, as a function of, or based on the historical behavior profile generated for each respective device, a determination is made as to whether or not there are new unknown destination IP addresses that appear in relation of current network traffic data received or obtained for the current day and included in a new day behavior profile. The determination in regard to whether or not new unknown destination IP address appear in relation to network data for a current day can be based on a comparison of data included in the generated historical behavior profile for a device at issue with respect to data included in network traffic data representative of the current day for the same device at issue (e.g., the new day behavior profile).

Based on, as a function of, or in response to determining or identifying an unknown destination IP addresses that did not appear in the historical behavior profile report for a particular device, but that appears in the new day behavior profile, a determination can be made in regard to whether the number of new unknown destination IP addresses exceeds a defined set point or threshold value. Where the number of unknown destination IP addresses exceeds a defined set point or threshold value, a further report that includes at least the identified unknown destination IP addresses can be generated as a new day behavior report supplemented with more intelligence.

Figure 6:
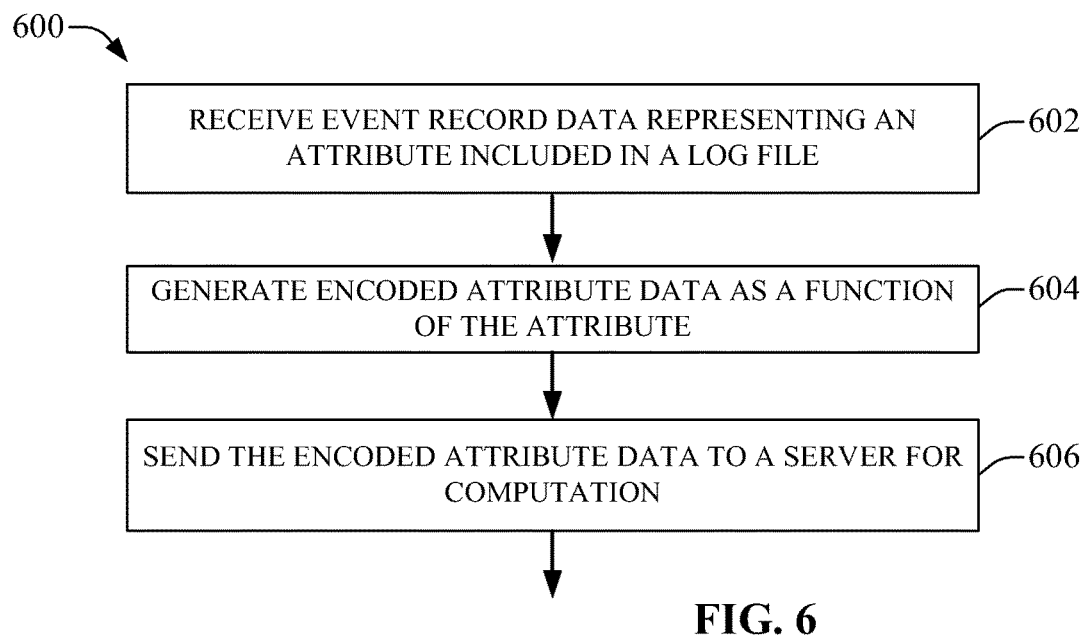
FIG. 6 provides illustration of a flow chart or method for providing secure computation of enterprise data in a cloud, by third party secure cloud computation vendors, in accordance with aspects of the subject disclosure.
Figure 7:
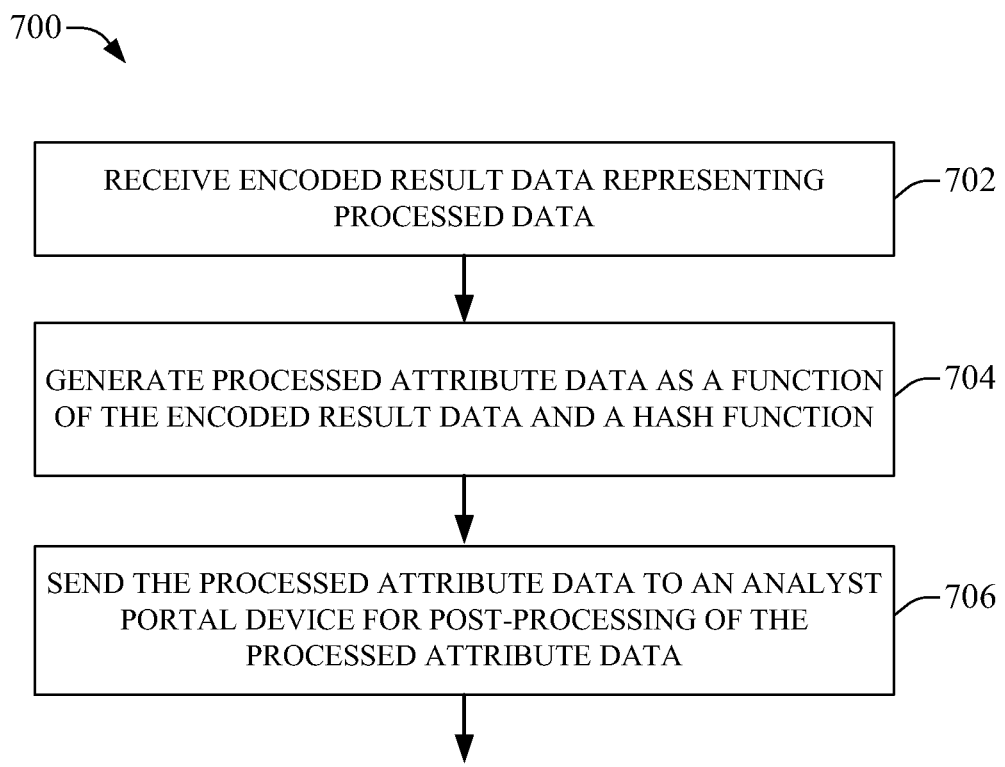
FIG. 7 provides illustration of a another flow chart or method for providing secure computation of enterprise data in a cloud, by third party secure cloud computation vendors, in accordance with aspects of the subject disclosure.

In view of the example system(s) described above, example method(s) that can be implemented in accordance with the disclosed subject matter can be better appreciated with reference to flowchart in FIGS. 6-7. For purposes of simplicity of explanation, example method disclosed herein is presented and described as a series of acts; however, it is to be understood and appreciated that the disclosure is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, the disclosed example method can be implemented in combination with one or more other methods, to accomplish one or more aspects herein described. It should be further appreciated that the example method disclosed throughout the subject specification are capable of being stored on an article of manufacture (e.g., a computer-readable medium) to allow transporting and transferring such methods to computers for execution, and thus implementation, by a processor or for storage in a memory.

FIG. 6 illustrates a method 600 for secure computation of enterprise data in a cloud, by third party secure cloud computation networks. Method 600 can commence at 602 where event record data representing one or more attributes can be received. The event record data can be received from, for example, firewall devices, proxy server devices, intrusion detection system devices, intrusion protection system devices, authentication devices, and the like, in the form of historical data representative of enterprise network logs, such as security logs generated by network devices. The event record data can have been stored with one or more attributes, such that an event e is associated with one or more attributes (a1, . . . , aN), wherein N is an integer value greater than zero (0).

At 604 the one or more attributes (a1, . . . , aN) can be encrypted using one or more one-way cryptographic hash function (H=(h1, . . . , hN), wherein each of the one or more attributes (a1, . . . , aN) can selectively have been associated with a salt value ((a1+s), . . . , (aN+s)), where s represents a salt value, and thereafter encrypted with the one or more one-way cryptographic hash function (H=(h1, . . . , hN), resulting in hashed event data comprising hashed attributes ((h1(a1+s), . . . , hN(aN+s)).

At 606, the hashed event data comprising hashed attributes can be sent to a computation server (e.g., one or more third party secure cloud computation vendors) for additional processing.

FIG. 7 depicts a method 700 for secure computation of enterprise data in a cloud, by third party secure cloud computation networks in accordance with an embodiment. Method 700 can commence at 702 where encoded result data representing processed event data can be received from one or more computation servers maintained and controlled by third party secure cloud computation vendors. On receipt of the processed event data, at 704, the processed event data can be decrypted to obtain the processed attribute values that can comprise the processed event data. At 704, this objective is effectuated by using a previously constructed data dictionary in conjunction with applying appropriate cryptographic hash function(s), and if required the identity function(s), ignoring inserted dummy attributes/fields, and where necessary removing salt values. At 706, the processed attribute data/values can be sent to an analyst portal device to be used, for instance, for purposes of network forensics, detection of distributed denial of service attacks, and the like, wherein connected graphs can be constructed to facilitate such analysis.

Figure 8:
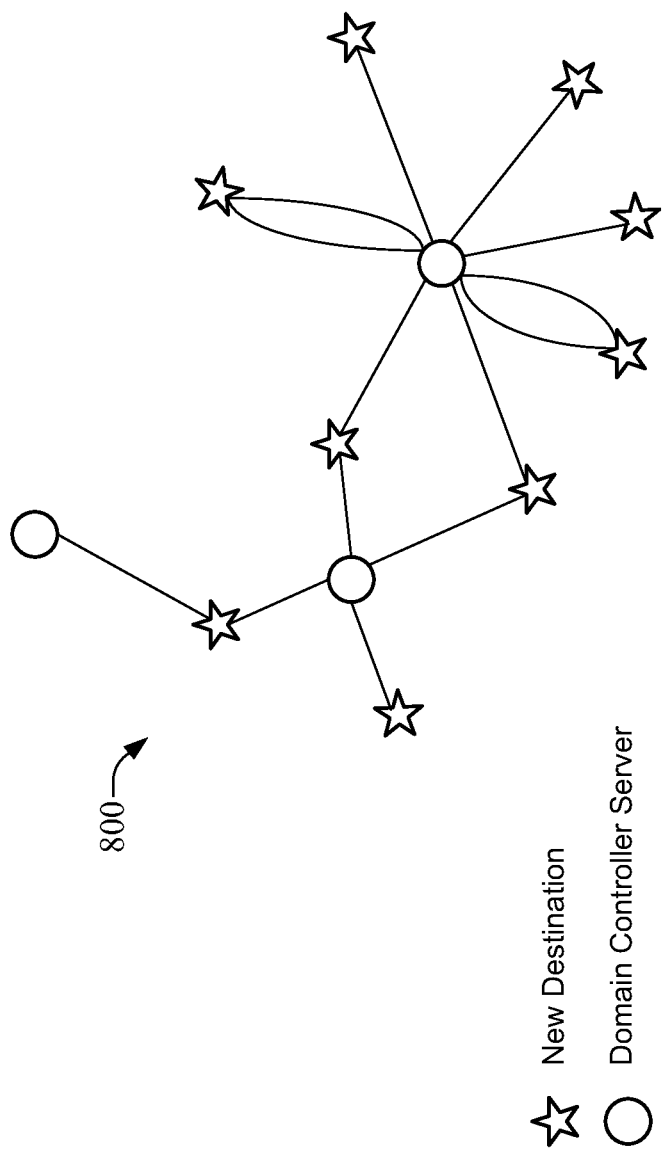
FIG. 8 provides illustrates an example graph structure that can be utilized to provide secure computation of enterprise data in a cloud, by third party secure cloud computation vendors, in accordance with aspects of the subject disclosure.

FIG. 8 provides illustration of an example connected graph 800 that can be constructed to facilitate network forensic in accordance with an aspect of the subject application. As illustrated the connect graph 800 can comprise domain controller server devices represented as nodes by circle symbols and new destination devices represented as further nodes by star symbols. Connections between the domain controller server devices, as represented the circle symbols, and the new destination devices, represented as star symbols, can be connected by edges that represent connections that have occurred between the domain controller server devices and the new destination devices. With respect to the connected graph 800 each of the nodes therein can be annotated with additional information, such as respective IP addresses associated with each of the domain control server devices and/or new destination devices. Further, each node can also be annotated to include other information, such as information regarding the institutions/enterprises who own the respective new destination devices and/or domain control server devices.

It should be realized and appreciated by those of ordinary skill, the foregoing non-limiting example use application(s) are merely illustrations of a use to which the disclosed and described solution can be applied and thus are provided solely for the purposes of exposition. The described and disclosed subject matter is therefore not limited to the foregoing example application(s), but can find applicability in other more generalized circumstances and use applications.

Figure 9:
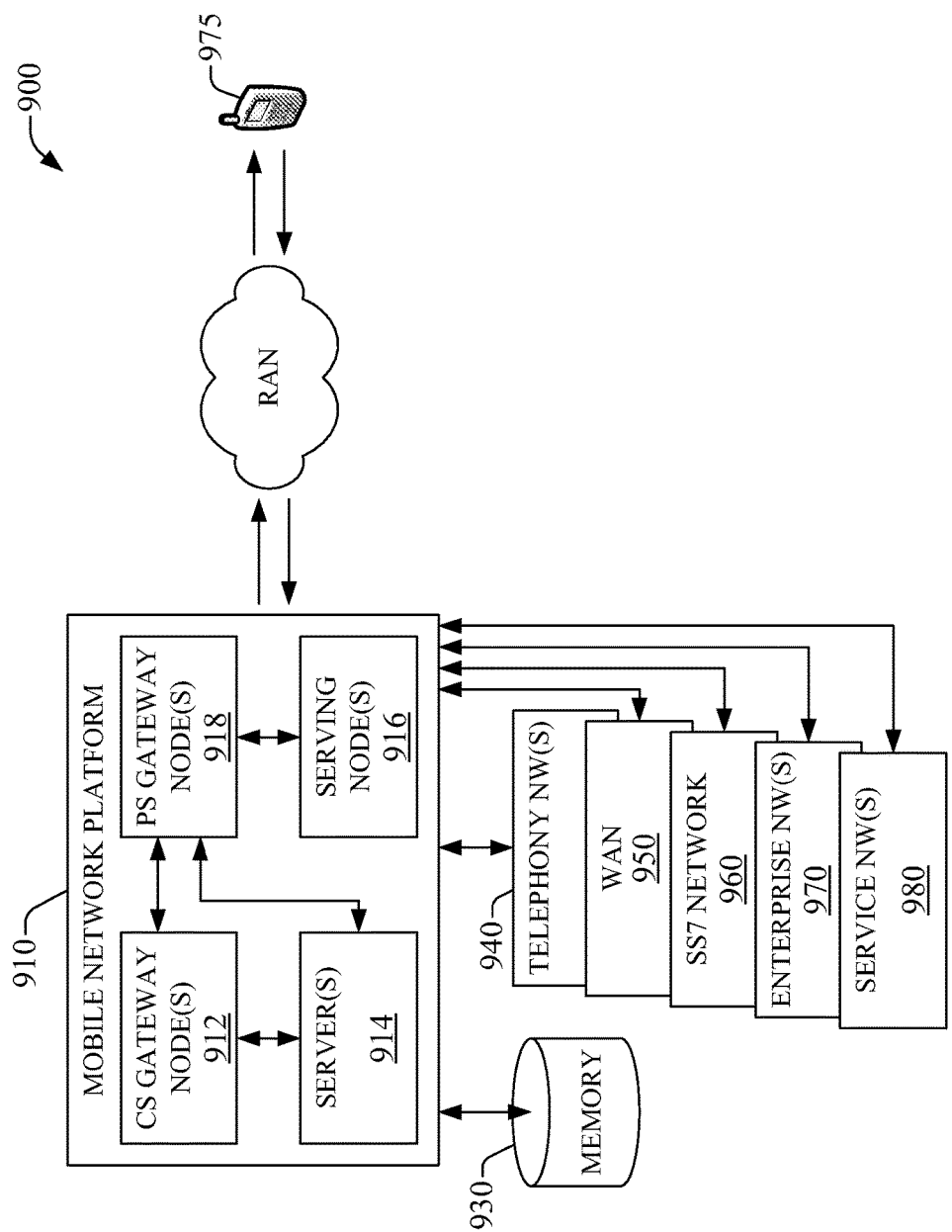
FIG. 9 is a block diagram of an example embodiment of a mobile network platform to implement and exploit various features or aspects of the subject disclosure.

FIG. 9 presents an example embodiment 900 of a mobile network platform 910 that can implement and exploit one or more aspects of the disclosed subject matter described herein. Generally, wireless network platform 910 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 910 can be included in telecommunications carrier networks, and can be considered carrier-side components as discussed elsewhere herein. Mobile network platform 910 includes CS gateway node(s) 912 which can interface CS traffic received from legacy networks like telephony network(s) 940 (e.g., public switched telephone network (PSTN), or public land mobile network (PLMN)) or a signaling system #7 (SS7) network 970. Circuit switched gateway node(s) 912 can authorize and authenticate traffic (e.g., voice) arising from such networks. Additionally, CS gateway node(s) 912 can access mobility, or roaming, data generated through SS7 network 970; for instance, mobility data stored in a visited location register (VLR), which can reside in memory 930. Moreover, CS gateway node(s) 912 interfaces CS-based traffic and signaling and PS gateway node(s) 918. As an example, in a 3GPP UMTS network, CS gateway node(s) 912 can be realized at least in part in gateway GPRS support node(s) (GGSN). It should be appreciated that functionality and specific operation of CS gateway node(s) 912, PS gateway node(s) 918, and serving node(s) 916, is provided and dictated by radio technology(ies) utilized by mobile network platform 910 for telecommunication.

In addition to receiving and processing CS-switched traffic and signaling, PS gateway node(s) 918 can authorize and authenticate PS-based data sessions with served mobile devices. Data sessions can include traffic, or content(s), exchanged with networks external to the wireless network platform 910, like wide area network(s) (WANs) 950, enterprise network(s) 970, and service network(s) 980, which can be embodied in local area network(s) (LANs), can also be interfaced with mobile network platform 910 through PS gateway node(s) 918. It is to be noted that WANs 950 and enterprise network(s) 960 can embody, at least in part, a service network(s) like IP multimedia subsystem (IMS). Based on radio technology layer(s) available in technology resource(s) 917, packet-switched gateway node(s) 918 can generate packet data protocol contexts when a data session is established; other data structures that facilitate routing of packetized data also can be generated. To that end, in an aspect, PS gateway node(s) 918 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 900, wireless network platform 910 also includes serving node(s) 916 that, based upon available radio technology layer(s) within technology resource(s) 917, convey the various packetized flows of data streams received through PS gateway node(s) 918. It is to be noted that for technology resource(s) 917 that rely primarily on CS communication, server node(s) can deliver traffic without reliance on PS gateway node(s) 918; for example, server node(s) can embody at least in part a mobile switching center. As an example, in a 3GPP UMTS network, serving node(s) 916 can be embodied in serving GPRS support node(s) (SGSN).

For radio technologies that exploit packetized communication, server(s) 914 in wireless network platform 910 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 910. Data streams (e.g., content(s) that are part of a voice call or data session) can be conveyed to PS gateway node(s) 918 for authorization/authentication and initiation of a data session, and to serving node(s) 916 for communication thereafter. In addition to application server, server(s) 914 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 910 to ensure network's operation and data integrity in addition to authorization and authentication procedures that CS gateway node(s) 912 and PS gateway node(s) 918 can enact. Moreover, provisioning server(s) can provision services from external network(s) like networks operated by a disparate service provider; for instance, WAN 950 or Global Positioning System (GPS) network(s) (not shown). Provisioning server(s) can also provision coverage through networks associated to wireless network platform 910 (e.g., deployed and operated by the same service provider), such as femto-cell network(s) (not shown) that enhance wireless service coverage within indoor confined spaces and offload radio access network resources in order to enhance subscriber service experience within a home or business environment by way of UE 975.

It is to be noted that server(s) 914 can include one or more processors configured to confer at least in part the functionality of macro network platform 910. To that end, the one or more processor can execute code instructions stored in memory 930, for example. It is should be appreciated that server(s) 914 can include a content manager 915, which operates in substantially the same manner as described hereinbefore.

In example embodiment 900, memory 930 can store information related to operation of wireless network platform 910. Other operational information can include provisioning information of mobile devices served through wireless platform network 910, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 930 can also store information from at least one of telephony network(s) 940, WAN 950, enterprise network(s) 960, or SS7 network 970. In an aspect, memory 930 can be, for example, accessed as part of a data store component or as a remotely connected memory store.

Figure 10:
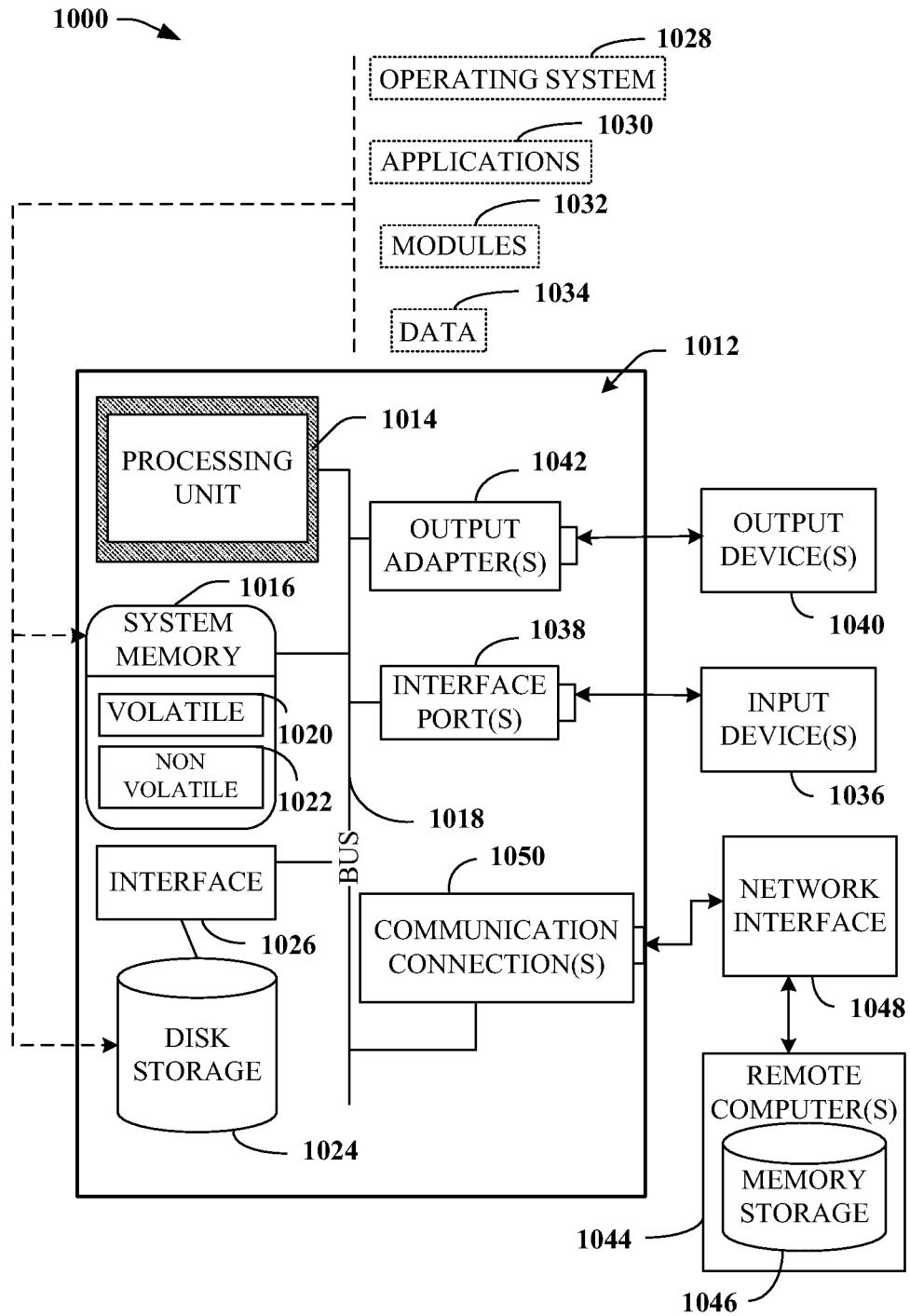
FIG. 10 illustrates a block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1020 (see below), non-volatile memory 1022 (see below), disk storage 1024 (see below), and memory storage 1046 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, part of the hardware of system 100, includes a processing unit 1014, a system memory 1016, and a system bus 1018. System bus 1018 couples system components including, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PC-MCIA), Firewire (IEEE 1194), and Small Computer Systems Interface (SCSI).

System memory 1016 can include volatile memory 1020 and nonvolatile memory 1022. A basic input/output system (BIOS), containing routines to transfer information between elements within computer 1012, such as during start-up, can be stored in nonvolatile memory 1022. By way of illustration, and not limitation, nonvolatile memory 1022 can include ROM, PROM, EPROM, EEPROM, or flash memory. Volatile memory 1020 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 can also include removable/non-removable, volatile/non-volatile computer storage media. FIG. 10 illustrates, for example, disk storage 1024. Disk storage 1024 includes, but is not limited to, devices like a magnetic disk drive, floppy disk drive, tape drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to system bus 1018, a removable or non-removable interface is typically used, such as interface 1026.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. For the avoidance of doubt, the term "computer-readable storage device" is used and defined herein to exclude transitory media. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software includes an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. As an example, mobile device and/or portable device can include a user interface embodied in a touch sensitive display panel allowing a user to interact with computer 1012. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 include, for example, a serial port, a parallel port, a game port, a universal serial bus (USB), an infrared port, a Bluetooth port, an IP port, or a logical port associated with a wireless service, etc. Output device(s) 1040 use some of the same type of ports as input device(s) 1036.

Thus, for example, a USB port can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 include, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, cloud service, a workstation, a microprocessor based appliance, a peer device, or other common network node and the like, and typically includes many or all of the elements described relative to computer 1012.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A first device, comprising:
   a processor; and
   a memory that stores executable instructions that, when executed by the processor, facilitate performance of operations, comprising:
   receiving security data representing an attribute included in a log file;
   generating encoded attribute data as a function of a grouping of data comprising the attribute, a hash function, and salt data representing an alphanumeric string, wherein the salt data is selectively distributed in the security data to form amended security data, and the hash function is selectively applied to the amended security data;
   encrypting, as a function of the hash function, manipulation instructions representing a data manipulation process to form encoded manipulations instructions;
   sending the encoded attribute data and the encoded manipulation instructions to a second device; and
   in response to the sending, receiving analytics data representative of a connected graph used to determine a distributed denial of service attack associated with a network device of a network, wherein the analytics data is generated based on facilitating the encoded attribute data being input, by the second device, to an executing instance of the encoded manipulation instructions.

2. The first device of claim 1, wherein the operations further comprise generating the encoded attribute data as a function of the attribute and an identity function.

3. The first device of claim 1, wherein the salt data is empty salt data comprising an empty string, and wherein the operations further comprise generating the encoded attribute data with the empty salt data.

4. The first device of claim 1, wherein the attribute is a dummy attribute representing empty field data.

5. The first device of claim 1, wherein the operations further comprise maintaining a decoding dictionary comprising a key, an encoded value representing the encoded attribute data, and an original value representing the attribute.

6. The first device of claim 1, wherein the log file is one of a grouping of files comprising a firewall log file, a proxy log file, an intrusion detection system log file, and an intrusion protection system log file.

7. The first device of claim 1, wherein the second device is a computation server device that processes the encoded attribute data to produce encoded result data.

8. The first device of claim 7, wherein the operations further comprise decoding the encoded result data as a function of a decoding dictionary.

9. The first device of claim 1, wherein the operations further comprise generating the encoded attribute data as a function of server list data representing a grouping of devices that satisfy a processing capacity threshold criteria value for processing the encoded attribute data.

10. The first device of claim 1, wherein the operations further comprise generating the encoded attribute data in response to receiving a register of devices that are approved as providing a defined privilege, a defined service, and a defined access.

11. A method, comprising:
generating, by a system comprising a processor, encoded attribute data as a function of a grouping of data comprising an attribute included in a log file, a hash function and salt data representing a string, wherein the salt data is selectively distributed through the encoded attribute data to form a modified log file, and the hash function is selectively applied to the modified log file;
generating, by the system, encoded processing instructions as a function of the hash function;
sending, by the system, the encoded attribute data and the encoded processing instructions to a device; and
receiving, by the system, analytics data representative of a connected graph used to determine a distributed denial of service attack associated with a group of networked devices, wherein the analytics data is generated based on facilitating an application of the encoded attribute data as an input to the encoded processing instructions in response to the encoded processing instructions being in execution on the device.

12. The method of claim 11, further comprising maintaining, by the system, a decoding dictionary comprising a key, an encoded value representing the encoded attribute data, and an original value representing the attribute.

13. The method of claim 11, further comprising generating, by the system, the encoded attribute data as a function of server list data representing a grouping of devices that satisfy a processing capacity threshold criteria value for processing the encoded attribute data by the device.

14. The method of claim 11, further comprising generating, by the system, encoded attribute data in response to receiving, by the system, a list of devices that are approved as providing a defined privilege, defined service, and a defined access.

15. The method of claim 11, further comprising generating, by the system, the encoded attribute data as a function of the attribute and an identity function.

16. The method of claim 11, wherein the salt data is empty salt data comprising a null string, further comprising generating the encoded attribute data with the empty salt data.

17. The method of claim 11, wherein the log file is received from a firewall device, a proxy device, and intrusion detection system device, or an intrusion protection system device.

18. The method of claim 11, wherein the device is a computation server device that processes the encoded attribute data to produce encoded result data.

19. A non-transitory machine-readable storage medium, comprising executable instructions that, when executed by a processor, facilitate performance of operations, comprising:
receiving event data representing an attribute included in a log file;
generating encoded attribute data as a function of the attribute, a one-way cryptographic hash function, and salt data representing an alphanumeric string, wherein the salt data is selectively distributed throughout the event data to form pre-processed event data and the one-way cryptographic hash function is selectively applied to the pre-processed event data;
sending the encoded attribute data and execution instructions representing instructions encoded as a function of the one-way cryptographic hash function to a device to process the encoded attribute data; and
receiving computed data in response to facilitating input of the encoded attribute data to the execution instructions executing on the device, wherein the computed data represents a connected graph used to determine a distributed denial of service attack associated with a network device of networked devices.

20. The non-transitory machine-readable storage medium of claim 19, wherein the operations further comprise generating the encoded attribute data as a function of server list data representing a grouping of devices that satisfy a processing capacity threshold criterion value for processing the encoded attribute data.

\* \* \* \* \*